United States Patent [19]
Magana

[11] Patent Number: 6,134,227
[45] Date of Patent: Oct. 17, 2000

[54] SECONDARY CHANNEL FOR RADIO FREQUENCY COMMUNICATIONS

[75] Inventor: Javier V. Magana, Austin, Tex.

[73] Assignee: Advanced Micro Devices, Sunnyvale, Calif.

[21] Appl. No.: 08/841,168

[22] Filed: Apr. 29, 1997

Related U.S. Application Data

[63] Continuation-in-part of application No. 08/567,133, Dec. 4, 1995.

[51] Int. Cl.[7] .................................................. H04Q 7/20
[52] U.S. Cl. ........................ 370/330; 370/280; 370/281; 370/436
[58] Field of Search ................................ 370/276, 277, 370/280, 281, 330, 436

[56] References Cited

U.S. PATENT DOCUMENTS

| 4,129,749 | 12/1978 | Goldman | 370/280 |
| 5,134,710 | 7/1992 | Akerberg | |
| 5,428,601 | 6/1995 | Owen | 370/330 |
| 5,475,677 | 12/1995 | Arnold et al. | 370/280 |
| 5,515,366 | 5/1996 | Chieu et al. | 370/347 |
| 5,533,027 | 7/1996 | Akerberg et al. | 370/347 |
| 5,566,168 | 10/1996 | Dent | 370/323 |
| 5,812,522 | 9/1998 | Lee et al. | 370/206 |

FOREIGN PATENT DOCUMENTS

| 0 677 930 A1 | 10/1995 | European Pat. Off. . |
| 2306083 | 4/1997 | United Kingdom . |
| WO 93/17507 | 9/1993 | WIPO . |
| WO 95/25406 | 9/1995 | WIPO . |
| WO 9721287 | 6/1997 | WIPO . |

Primary Examiner—Hassan Kizou
Assistant Examiner—Mitchell Slavitt

[57] ABSTRACT

A system for radio frequency communications between a first unit and a second unit. The communications are conducted over a first frequency and a second frequency. The first unit and the second unit each transmit and receive communications, including first, second, third and fourth information, in bursts over select time intervals, including a first time interval and a second time interval. The system includes communication between a plurality of wireless handset units and a base unit utilizing a FDD/TDD format.

11 Claims, 5 Drawing Sheets

Two Handset / One base — TDD / FDD system

Hybrid TDD / FDD

Digital TDD

Analog FDD $f_{Tx} = f_{Rx}$ $f_{Tx} \neq f_{Rx}$ $f_{Tx} \neq f_{Rx}$

Two Handset / One base – TDD / FDD system

SECONDARY CHANNEL FOR RADIO FREQUENCY COMMUNICATIONS

CROSS-REFERENCE TO RELATED APPLICATIONS

This application is a continuation-in-part of application Ser. No. 08/567,133, filed Dec. 4, 1995, entitled "System and Method for Frequency Division Duplex/Time Division Duplex Radio Frequency Communications", which is incorporated herein by reference thereto.

BACKGROUND OF THE INVENTION

1. Field of the Invention

This invention relates to radio frequency communications and, more particularly, to a frequency division duplex/time division duplex (FDD/TDD) system and method for radio frequency communication for greater quantities of information over a limited spectrum for lower cost by providing a secondary communications channel, in addition to a primary communications channel, for full duplex communication over both the primary and secondary channels.

2. Brief Description of Related Technologies

Radio components can be some of the most expensive portions of radio frequency (RF) communications equipment. This is particularly the case in cordless, or wireless, telephony. In RF communications and particularly, in cordless or wireless telephony, costs and operational requirements determine the viability of communications equipment designs. The engineering designer is often presented with design constraints imposed by the costs of component, or by operational requirements. Such costs and operational requirements are particularly important considerations when communications equipment is intended for lower-end consumers, such as individuals and households.

Cordless phones based on analog and/or continuous variable slope delta (CVSD) digital methods use FDD to provide a wireless link between a base and handset. Since FDD requires two frequencies to accommodate a full-duplex link, the two carriers are used 100% of the time during a call. To adequately support two handsets an FDD base station design would require one RF transceiver for each handset. Since the cost of a cordless phone depends on not only the handset cost but the base station cost as well, the cost of the system increases.

Products which advertise similar capability either mean a two-line (i.e. PSTN) to two handset capability, provide a second RF transceiver at the base, or are designed to allow either handset to detect an incoming call but only one to be used during a call; the second handset is then unable to share in the conversation.

In RF communication technology, including cordless phones, various standards established by industry and other sources often dictate performance and equipment requirements. Standards have been established, for example, for cordless or wireless telephony products and other communications devices. Some examples of the most common standards of the cordless telephone industry include: the Cordless Telephony Second Generation (CT2) standard, the European Conference of Postal and Telecommunications Administrations (CEPT) standard, referred to as the Cordless Telephony First Generation (CT1) standard, the Cordless Telephony First Generation Plus (CT1+) standard, and the Digital European Cordless Telecommunications (DECT) standard.

The CT2 standard, for example, employs a time division duplex (TDD) system and methodology. In TDD, transmit and receive communications occur among two stations, such as, for example, a handset and base set unit of a cordless telephone, in a burst manner at distinct intervals of time. In the past, devices conforming to CT2 have transmitted and received over an identical carrier frequency within the bandwidth dictated by the standard. Communications have been possible in TDD units because different time intervals are employed for transmissions and receptions by each station. During an interval that one station is transmitting, the other is receiving, and vice versa, over the same bandwidth. Devices built according to the CT2 standard have been considered more spectrally efficient than FDD based devices. This is due, in part, attributable to the use in those devices of only a single radio channel for transmitting and receiving. However, the primary way to transmit and receive more data in a CT2 system was to compress the data transmitted in the allotted time interval. This is disadvantageous since as data is further compressed the devices become more expensive by requiring more processing capabilities and system bandwidth, which causes communications quality to sulfer.

Other cordless telephone standards, such as the CT1 standard, have at times employed a frequency division duplex (FDD) concept. In typical FDD, transmit and receive communications occur over two distinct, separate carrier channels. Thus, two FDD communications stations, such as, for example, a handset unit and a base set unit of a cordless telephone, each transmit and receive over different carrier channels. While a first unit is transmitting over a particular channel at a first frequency, the second unit is receiving on that same channel over the same frequency. When the second unit transmits, it does so on a separate channel at a second frequency and the first unit receives or that different channel at that second frequency. FDD systems tend to be less expensive than TDD systems because of their analog nature of conveying voice signals over a communications channel when compared to the digital nature of TDD based systems.

Beyond TDD and FDD, other communications methodologies are continually being developed. Certain promising methodologies include use of a dual channel synthesizer and spread spectrum approaches. Common FDD based designs use a dual synthesizer approach for synthesizing the necessary channels for communication. TDD designs, on the other hand, require the generation of another oscillator source for accomplishing communications over a single carrier frequency. However, the spectrum efficiency of such a system is less than for a TDD based system, since two Frequencies are utilized instead of one. But, the additional filtering needed for reducing spurs in a TDD system makes such a system less attractive from a cost viewpoint. A drawback of this approach is that additional filters are required to attenuate the frequency image (referred to herein as "Spurs"). The use of dual frequency sources, as used in A FDD implementation, alleviates that requirement at the expense of using a second synthesizer and local oscillator.

In spread spectrum communications technology, a sequential noise-like signal structure is employed to spread normally narrow band information signals over a relatively wide band of frequencies. The receiver in such systems correlates the special spectrum transmission signals to retrieve the original information being transmitted. Spread spectrum technology provides certain benefits, such as greater information over one channel. A disadvantage of spread spectrum technology, however, is increased expense because significant processing capacity is necessary to transmit and receive over the broad spectrum of frequencies employed.

As is apparent, there are numerous ideas and approaches to radio frequency communications in cordless telephony. On the one hand, TDD methods can be advantageous because of the minimal spectrum necessary for such communications. On the other hand, FDD methods provide advantages of continuous and simultaneous transmission and reception and lower system cost. The limitations of both such methods, though, are apparent, as previously discussed. The newer communications methods also provide certain advantages, but they do so only at greater expense or by use of more frequency spectrum. It would, therefore, be a significant improvement in the art and technology to provide an improved system and method for radio frequency communication which is low cost, and yet allows for communications of larger amounts of continuous and simultaneous information, such as voice and data information.

The present invention employs a unique system and method for a hybrid digital FDD/TDD radio frequency communications format in which a secondary channel is provided to allow radio frequency communications between two mobile units and a base unit over the channels to occur concurrently. FIGS. 1a and 1b illustrate the FDD and TDD schemes of the prior art.

Though the background of the invention has been described, in part, with respect to cordless telephone applications and, in particular, to applications under the various standards and emerging technologies described above, the invention has other varied applications which will be hereinafter more fully understood.

SUMMARY OF THE INVENTION

An embodiment of the invention is a method of digital radio frequency communications over a first channel and a second channel, each channel employing a different carrier frequency. The method comprises the steps of transmitting first information during a first time interval, over the first channel, at a first frequency, transmitting second information during a second time interval, over the first channel, at the first frequency, receiving first information during the second time interval, over the second channel, at a second frequency, and receiving second information during the first time interval, over the second channel at the second frequency.

Another embodiment of the invention is a method of radio frequency communications between two mobile handset units and a base unit. This is illustrated in FIG. 1c. The method comprises the steps of transmitting information during a first time interval over a first frequency by a first mobile unit, transmitting information during a second time interval over the first frequency by a second mobile unit, transmitting information by the base unit to the second mobile unit during the first time interval over a second frequency, and transmitting information by the base unit to the first mobile unit during the second time interval over the second frequency.

In particular, an embodiment of the present invention for a cordless phone includes a single base station having one RF module and two handsets. This embodiment allows connection to existing PSTN communication channels with no special requirements. During normal operation, the base station is connected to the PSTN with the two handset units able to roam freely within a defined perimeter, such as a business or residential setting.

An advantage of this two handset embodiment for cordless phones is that it provides flexibility by using the FDD/TDD scheme of the present invention, described herein, which is preferably implemented on a 900 MHz digital narrow-band design.

An advantage to this type of operation is that overall system cost is reduced since although two FDD frequencies are used at the base, these would be viewed by the base as two TDD radio links. Therefore, only the base unit would be operating under full FDD conditions which would require incurring the cost of only one additional synthesizer commonly required for FDD operations. The two handsets would be operated in FDD/TDD as before and would benefit from power saving characteristics that TDD offers.

Yet another embodiment of the invention is a system for radio frequency communications over a first frequency and a second frequency. The system transmits and receives communications, including first information and second information, in bursts during time intervals, including a first time interval and a second time interval. The system comprises circuitry for transmitting the first information during the first time interval, over the first frequency, circuitry for transmitting the second information during the second time interval, over the second frequency, circuitry for receiving the first information during the first time interval, over the first frequency, and circuitry for receiving the second information during the second time interval, over the second frequency.

Another embodiment of the invention is a system for radio frequency communications between a first unit and a second unit. The communications are conducted over a first frequency and a second frequency. The first unit and the second unit transmit and receive communications, including first, second, third and fourth information, in bursts over select time intervals, including a first time interval and a second time interval. The system comprises circuitry for transmitting the first information during the first time interval over the first frequency by the first unit, circuitry for receiving the first information during the first time interval over the first frequency by the second unit, circuitry for transmitting the second information during the second time interval over the second frequency by first unit, circuitry for receiving the second information during the second time interval over the second frequency by the second unit, circuitry for transmitting the third information during the first time interval over the second frequency by the second unit, circuitry for receiving the third information during the first time interval over the second frequency by the first unit, circuitry for transmitting the fourth information during the second time interval over the first frequency by the second unit, and circuitry for receiving the fourth information during the second time interval over the first frequency by the first unit.

Yet another embodiment of the invention is a method of radio frequency communications. The method comprises the steps of first transmitting by a first unit, first receiving by the first unit simultaneously with the step of first transmitting, second transmitting by a second unit non-simultaneously with the step of first transmitting, and second receiving by the second unit simultaneously with the step of second transmitting.

DETAILED DESCRIPTION OF THE PREFERRED EMBODIMENT

Figure 6:
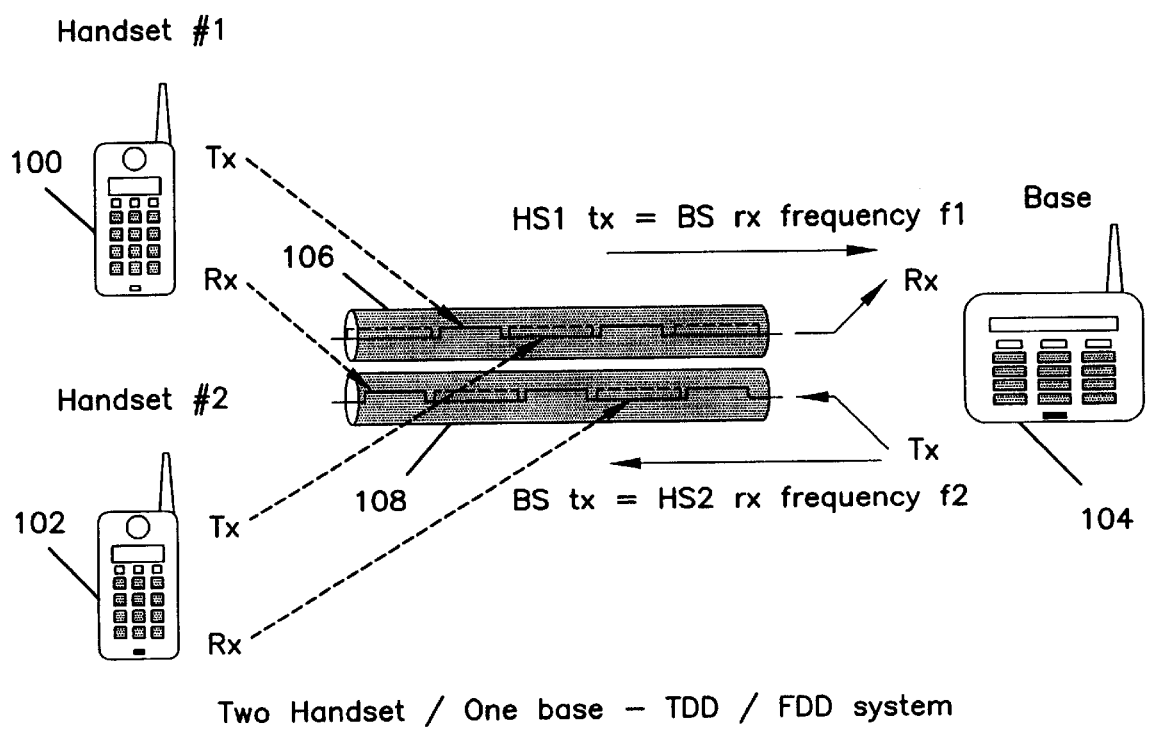
FIG. 6 schematically illustrates one embodiment of the FDD/TDD RF communication system and a frame structure of the present invention.

The following detailed description addresses certain embodiments of a novel system and method for providing radio frequency communications over a secondary channel concurrently during radio frequency communications over a primary channel, employing FDD/TDD RF communications. The FDD/TDD scheme is illustrated in FIG. 6 showing an embodiment of the invention where two mobile handset units 100, 102 are in communication with A single base unit 104. A first channel 106 and a second channel 108 are used to facilitate digital communications between each handset unit 100, 102 and base unit 104. See FIG. 1c. Channels 106 and 108 operate at different frequencies. The invention is explained by reference to prior TDD and FDD technology. It is also presented through an explanation of various cordless telephony standards and, in particular, through a discussion of adaptation of a prior RF communications device operating in TDD mode. Those skilled in the art will readily recognize that the invention may be employed in varied manners and under varied conditions, as well as in other applications. All other embodiments and applications are intended to be included in the description herein.

Figure 1C:
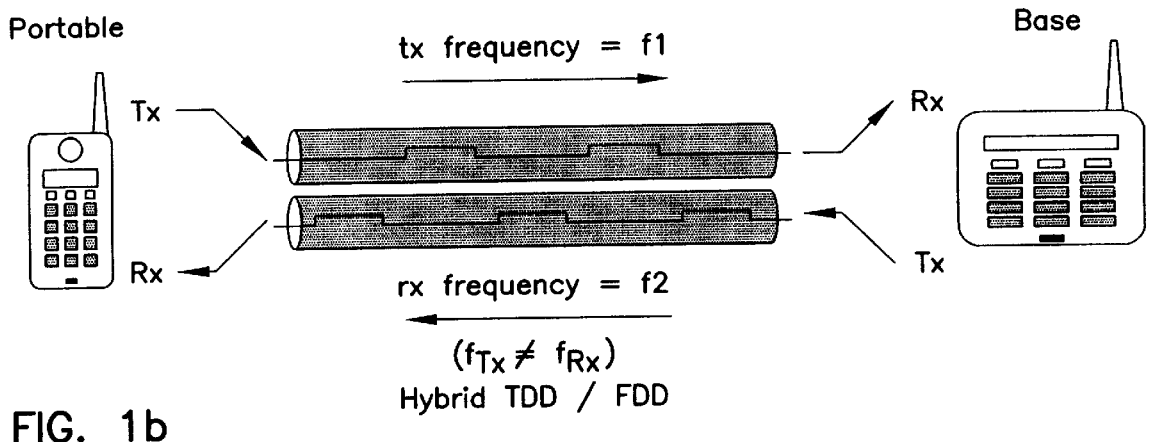
FIG. 1c depicts an embodiment of a hybrid FDD/TDD scheme of the present invention.
Figure 1B:
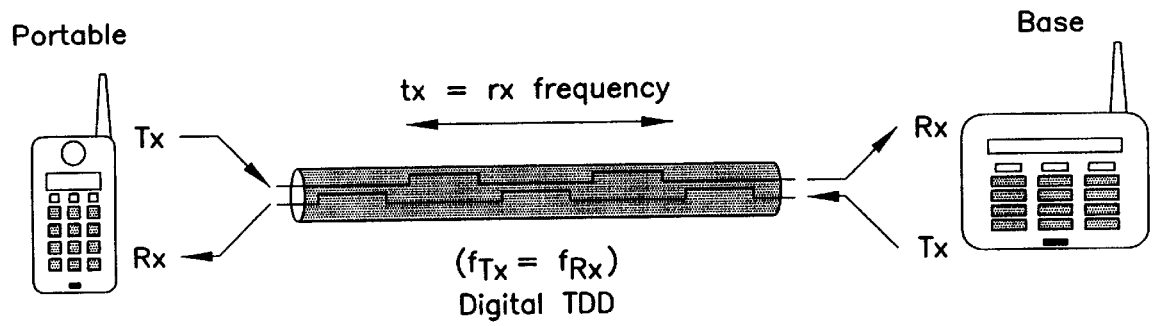
FIGS. 1a and 1b are illustrative of the FDD and TDD communications schemes of the prior art.
Figure 1A:
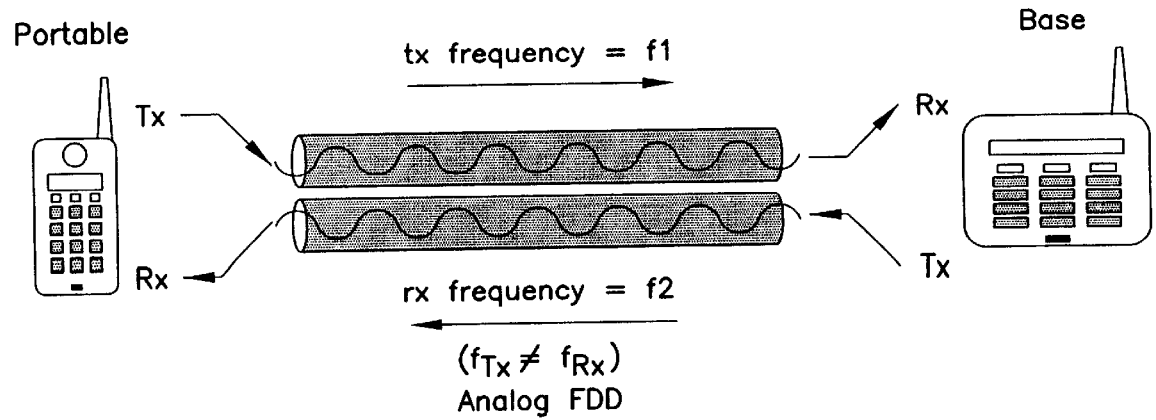
Figure 2:
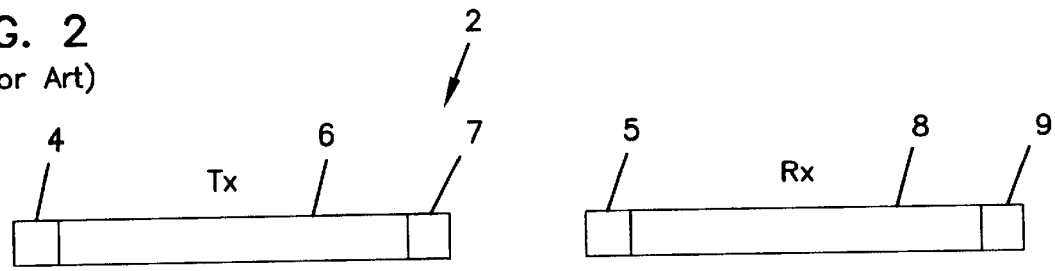
FIG. 2 is an illustration of transmit and receive signals of a RF communications unit employing a TDD approach, wherein both transmission and reception occur over the same frequency channel.
Figure 3:
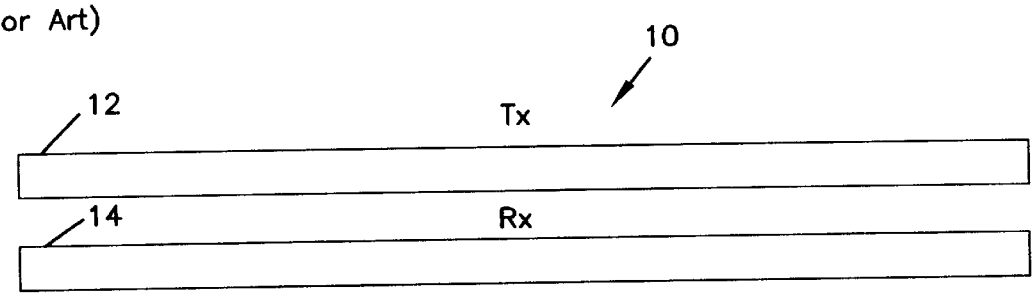
FIG. 3 is an illustration of transmit and receive signals by a RF communications unit employing a FDD methodology, wherein transmit and receive signals pass over different frequency channels.

In general, referring to FIG. 3, transmit ($T_x$)12 and receive ($R_x$)14 communications of a device operating according to FDD principles are illustrated. FDD signal transmissions 12 are accomplished over a first carrier frequency and signal receptions 14 are accomplished over a second carrier frequency. In the illustration of FIG. 3, the transmission 12 over time is depicted by the top box and the reception 14 over time is depicted by the bottom box. The vertical displacement of the two boxes is employed to indicate that two separate carrier frequencies serve for transmission 12 and reception 14, respectively. The same displacement representation is used in FIG. 4 for the same reason. In the presentation of FIGS. 1a–c. as well as FIGS. 2 and 3, time progresses in passing from left to right across the page.

Still referring to FIG. 3, this FDD methodology is like that employed in cordless telephones operating according to the CT1 standard. According to that standard, analog signals are passed between communication devices as transmissions 12 and receptions 14. Operation over separate frequencies for transmit 12 and receive 14 communications has previously required more devices or components, such as, for example, radio components, in order to perform such communications, and so FDD methodology devices can be relatively expensive when supporting more than one channel. Also, because FDD operations occur over the separate frequencies for transmission 12 and receptions 14, more spectrum may be used up in FDD communications, at least in comparison to typical TDD communications.

Referring now to FIG. 2, transmit 4, 6, 7 and receive 5, 8, 9 signal sequences of a TDD communications device are depicted. In TDD communications, the communications are digitized by converting he communications, for example, voice or data, into a binary pattern. The digital binary pattern is then buffered and transmitted at a high rate in bursts at distinct intervals of time. Only a single carrier frequency may be necessary for TDD communications. Time division of transmissions 4, 6, 7 and receptions 5, 8, 9 into distinct time intervals allows both receive 5, 8, 9 and transmit 4, 6, 7 signals to be accomplished over the single frequency.

Continuing to refer to FIG. 2, both the left and right boxes represent digitized communications being transmitted and received throughout periods of time. The box on the left represents a transmission ($T_x$) 4, 6, 7. The transmission 4, 6, 7 may include certain beginning transmit control bits 4 and certain transmitted information bits 6. The information bits 6 may, for example, be digitized voice or data signals. The transmission 4, 6, 7 may also include end control bits 7. The transmission 4, 6, 7 occurs on a particular carrier frequency and is burst over distinct intervals of time.

Further still referring to FIG. 2, reception ($R_x$) 5, 8, 9 of communicated information occurs over the same carrier frequency as the transmission 4, 6, 7, but at different intervals of time. This interval of time for reception 5, 8, 9 is different from the interval of the transmission 4, 6, 7. The reception 5, 8, 9 may include beginning control bits 5, received information bits 8 and ending control bits 9. Because distinct intervals of time are set for transmissions 4, 6, 7 and receptions 5, 8, 9, the same carrier frequency can support both transmissions 4, 6, 7 and receptions 5, 8, 9, albeit at those different intervals of time.

Still referring to FIG. 2, the TDD communication sequence illustrated here is the type performed by the prior communications units which conform to the CT2 standard for cordless telephones. To conform to that standard, both transmissions 4, 6, 7 and receptions 5, 8, 9 occur over the same carrier in the typical TDD manner. The interval during which both transmission 4, 6, 7 and reception 5, 8, 9 occurs is two milliseconds long. In each one millisecond of time, the standard provides that 66/68 bits can be transmitted (4, 6, 7) or received (5, 8, 9) by a CT2 device. A disadvantage of prior communications devices conforming to the CT2 standard has been cost of the devices.

Figure 4:
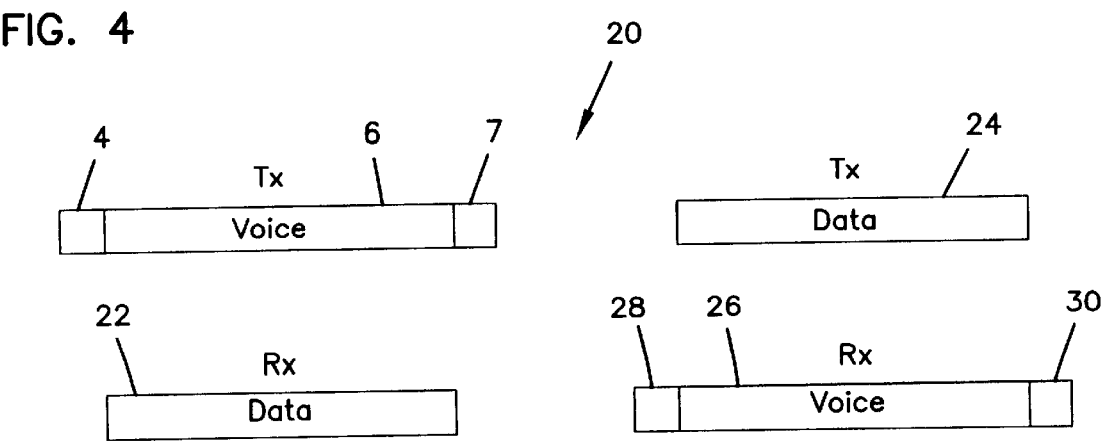
FIG. 4 is an illustration of transmissions and receptions by a unit employing in embodiment of the hybrid FDD/TDD RF communications approach of the present invention, wherein two carrier channels are employed for frequency division duplexed transmissions; receptions, and such transmissions and receptions are burst in a time division manner.

Now referring to FIG. 4, it may be understood how the present invention employs a new FDD/TDD approach to enable simultaneous communications over two separate channels, a primary communications channel and a secondary communications channel. Transmission of voice 4, 6, 7 and data 24 and reception of data 22 and voice 28, 26, 30 according to the FDD/TDD approach of the present invention are illustrated. In the FDD/TDD approach, an RF communications unit 120 (FIG. 5), that is the "radio front end" of a base unit 118 (FIG. 5) is designed and configured to employ FDD in a TDD manner. Such an RF Communications unit 120 (FIG. 5) may be employed with a cordless telephone digital base unit 52 (FIG. 5) that operates according to TDD methodology.

Generally, the FDD/TDD approach employs a dual duplex design, i.e., a first carrier channel for transmission of digital signals by two handset units, and a different, second carrier channel for reception of digital communications by the two handset units to a base unit. Over each carrier channel, communications are passed in bursts of distinct time intervals in a time division manner. Such an arrangement allows greater amounts of information, for example, both voice and data, to be simultaneously communicated.

Referring again to FIG. 4, in an embodiment of the present invention, transmission of voice ($T_x$) 4, 6, 7 and transmission of data ($T_x$) 24 by a first unit occur over a first carrier channel in separate, distinct time intervals. Over a different, second carrier channel, reception of data ($R_x$) 22 and voice ($R_x$) 28, 26, 30 cicurs over a second carrier channel in separate, distinct time intervals coinciding with the transmission time intervals. In this manner, transmission of voice 4, 6, 7 and reception of data 22 can occur simultaneously and transmission of data 24 and reception of voice 28, 26, 30 can occur simultaneously, each in distinct and different time intervals, over dual carrier frequencies.

Continuing to refer to FIG. 4, it can be seen that if a communications unit, such as a cordless handset unit, transmits and receives by the scheme shown in FIG. 4, significantly more information can be passed between units, even though it is being passed over only two channels. In the prior technology, such as in single channel TDD methods the same channel has previously been used in a time division manner only to allow both transmission 4, 6, 7 and reception 5, 8, 9 (See FIG. 2). Also, in the prior technology, such as in FDD, frequency division has previously been used only by employing different channels for transmission 12 and reception 14 (See FIG. 3). The present invention takes advantage of both the particular advantages realized from TDD and FDD by incorporating the two concepts in the mariner previously described, at low cost.

The TDD frame structure of FIG. 4 defines a burst structure for transmission of signaling channel bits 4, 7 which are meant for system control and 64 bits of voice data 6, and also the same burst structure for bit reception, i.e., control bits 28, 30 and voice data 26.

Figure 5:
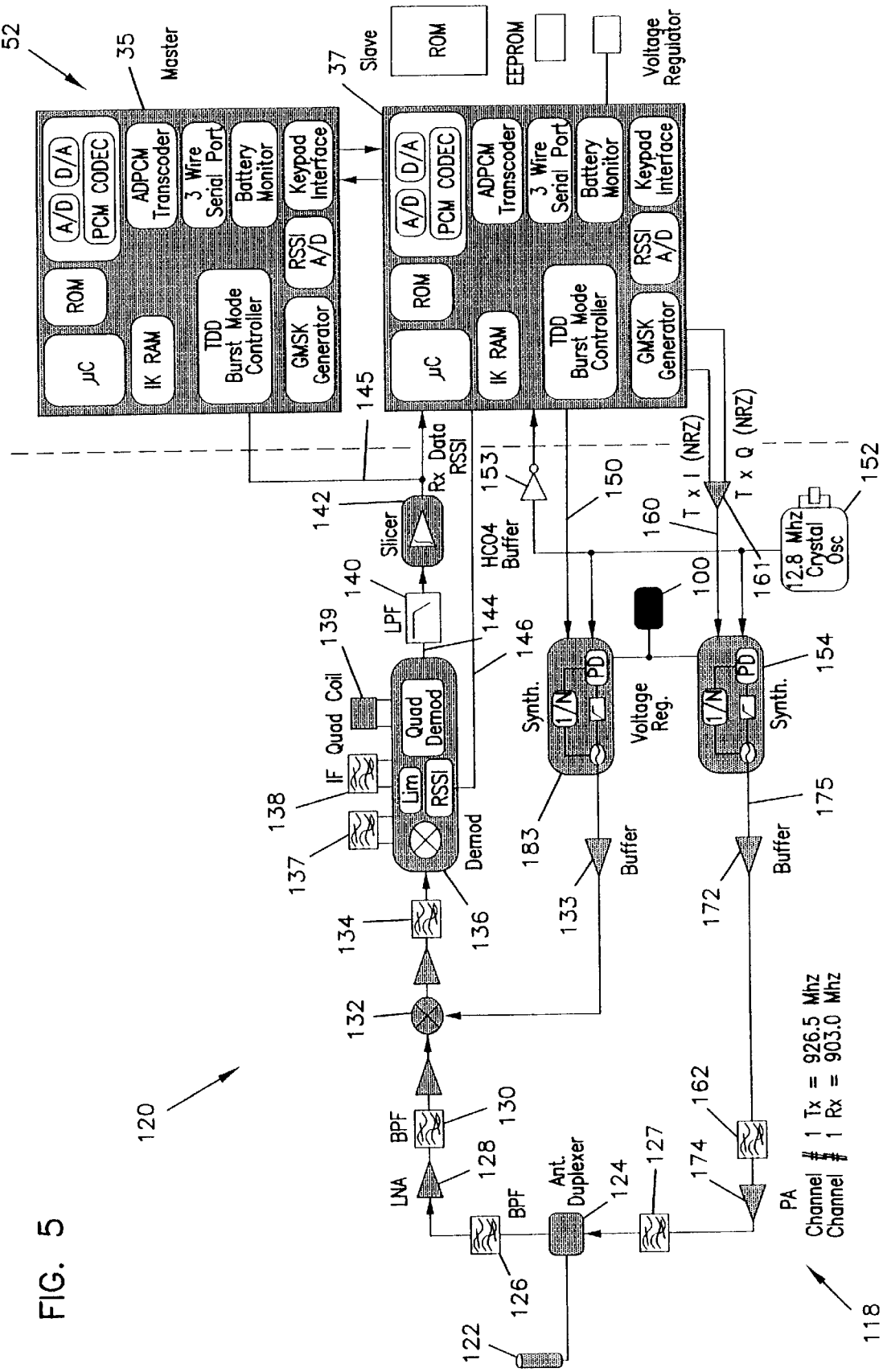
FIG. 5 is an architectural embodiment of a device for performing the FDD/TDD dual channel RF communications according to the present invention, which device allows for simultaneous transmission and reception of voice and data information.

Now referring to FIG. 5, an FDD/TDD dual channel RF communications portion 120 of base unit 118, the FDD/TDD base unit 118 may have the following, characteristics in a communications system comprised of a pair of cordless handset units and a base unit, as shown in FIG. 6. The handsets may, for example, cover the range of about 902 MHz to about 904 MHz, and the base station receiver may, for example, cover the range of about 925.5 MHz to about 927.5 MHz, both in 100 KHz increments.

Continuing to refer to FIG. 5 and the embodiment therein shown, on the reception side, the portion 120 includes an antenna 122 for communicating with the handset units. The antenna 122 is connected with an antenna duplexer 124, for example, two bandpass filters, 126 and 127. The duplexer 124, which includes filters 126 and 127, operates to distinguish receptions and transmissions of the portion 120 and to allow them to be received and transmitted over the appropriate frequency by the base unit 118. Received signals are thereafter amplified, filtered, detected and converted to received information ($R_x$) 145 for use by master and slave (35, 37) controllers of base unit 118. The received signals, after leaving duplexer 124, pass to a first bandpass filter 126, for example, a 2-pole dielectric resonator bandpass device, then to a low noise RF amplifier 128, for example, having a common emitter design. If desired, the amplifier 128 may be powered only during periods in which receptions are being received, to conserve power. The output of the amplifier 128 connects with a second bandpass filter 130. The filter 130 serves to improve the overall image rejection and to filter the image noise caused by the amplifier 128.

Still referring to FIG. 5, the output of the second bandpass filter 130 connects to the input of a mixer 132. Also connected as an input to the mixer 132 is the output of a first synthesizer 183 through a buffer amplifier 133. The mixer 132 converts the amplified and filtered received signal to an intermediate frequency. The output from the mixer 132 is filtered by a first intermediate frequency filter 134, for example, a ceramic device which may save a bandwidth of approximately 10.7 MHz.

Further referring to FIG. 5, the intermediate frequency signal is then input to an intermediate frequency (IF) demodulator subsystem 136. The subsystem 136 receives the intermediate frequency signal and amplifies, filters and limits it, and generates receive baseband ($R_x$) signal 144 and receive signal strength indicator (RSSI) output signal 146. The first stage of the subsystem 136 may be a mixer which can be used to convert the input intermediate frequency signal to a second intermediate frequency signal if the application so requires it. However, in some applications, the second intermediate frequency signal may be amplified. The mixer may be converted to provide the amplification by generating a DC imbalance in a Gilbert Cell 139, such as by altering the biasing of a crystal oscillator provided through a resistor connected to ground. The amplified signal may then be input to a second intermediate frequency filter 137. The output of that filter connects to an intermediate frequency amplifier that drives a final intermediate frequency filter 138 that connects to a limiter. The limiter adds gain and reduces FM noise and rejects AM.

Continuing to refer to FIG. 5, the output of the limiter may be coupled to an input of a multiplier. A phase-shifted version of that output from the limiter is connected to another input of the multiplier. The phase-shift may be provided, for example, by a parallel tuned circuit which may be adjusted so that such output and such phase-shifted version of the output are in quadrature. The output of the multiplier is the recovered receive baseband signal prior to being amplified and restored. The receive signal strength indicator (RSSI) signal 146 from the subsystem 136 may be passed to the baseband processor slave controller 37 of the base unit digital unit 52. The RSSI signal 146 may be produced by the subsystem 136 by monitoring the current drawn in the limiter stages.

Still referring to FIG. 5, the subsystem 136 may pass the receive baseband signal 144 to post detection processing circuitry. Thereafter, the filtered and perhaps amplified receive baseband signal 144 may be passed to a squaring circuit to reconstitute the digital data. The squaring circuit may include, for example, a filter 140 and a slicer 142. The slicer 142 converts the baseband signal 144 to a digital signal, preferably using a 1 bit quantizer. The digital signal is passed on to the base unit digital unit 52 as the received ($R_x$ Data) signal 145.

Further referring to FIG. 5, on the receive circuitry side, a signal from a local oscillator 152, for example, a 12.8 MHz crystal, is input to a first synthesizer 183 as a reference. The first synthesizer 183 tales the signal from oscillator 152 and drives a divide-by-P prescaler and divide-by-N counter. The output of the divide-by-N counter may be connected to an input of a phase/frequency detector. The output of the divide-by-R counter may connect to a reference input of the phase/frequency detector. The detector generates an error signal that is used to drive the first synthesizer 183 onto a first programmed frequency which is the primary communications channel. The first synthesizer 183 connects with a voltage regulator 100 to minimize noise.

Still referring to FIG. 5, in sum, the reception side circuitry serves to receive the received signals, whether voice 28, 26, 30 or data 22 (FIG. 4), depending on the particular time interval at a select first RF frequency of the primary carrier channel and render the received signals useable by the base unit digital unit 52 as a digital received signal 145.

Still referring to FIG. 5, the transmit side circuitry also includes a synthesizer 154. The synthesizer 154 may, for example, be a phase-locked loop utilizing the oscillator crystal 152 for reference generation. A digital baseband transmit signal 160 is generated in a TDD manner by the slave portion 37 of base unit digital unit 52 by, for example, a TDD burst mode controller. Signal 160 may be buttered by buffer amplifier 161. An output of the divide-by-N counter of synthesizer 154 may be connected to an input of a phase/frequency detector.

Continuing to refer to FIG. 5, on the transmit side of the RF communications portion 120, transmit side circuitry may accept the signal 175 output from synthesizer 154. The signal 175 may then be buffered by buffer amplifier 172. A power amplifier 174 may then amplify the signal 175 after it passes through a bandpass filter 162. If desired, the transmit stage may be powered only during transmit intervals. The stage may, for example, deliver about zero dBm to the antenna duplexer 124. In that example, the transmit output level at the antenna 122 may be about −1 dBm.

Continuing to refer to FIG. 5, the components and connections indicated on FIG. 5 are examples of a possible configuration of the FDD/TDD RF dual communications portion 120. In the example, the frequency shift between transmissions of voice 4, 6, 7 and data 24, on the one hand, and receptions of data 22 and voice 28, 26, 30, on the other hand, is preferably about 23.5 MHz and the receive signal frequency is at about 903 MHz for the transmit signal and is at 926.5 for the receive channel. Of course, the particular frequency shift and receive and transmit signal frequencies are only an example of possible configurations employing the FDD/TDD approach of the present invention.

In general, the present invention allows a single base unit, having one RF module, to communicate with two handset units. The base unit uses specific frame structures in conjunction with a signaling channel to indicate, preferably, call incoming information, call releasing information, or as a means of addressing a handset unit. Similar frame structures are used by the handset units to indicate, preferably, call originating information, call answering information, call clear-down information, or an identifying address signal. The combination of different frame structures in combination with individual l.D.s uniquely assigned to the base unit and each handset unit prevents communication between the base unit and handset units not paired to that unit. That is, a radio link can only be set up when a unique combination of signaling messages and I.D.s are exchanged between a base unit and a paired handset unit.

As in the case for any synchronous digital system, synchronization and burst level must be acquired before communication between the handsets and base unit can occur. To facilitate this, two physical layer frame structures containing synchronization fields are incorporated in the scheme of the present invention.

One type of frame structure is used to set up a link from a base unit to a handset unit and another frame structure is used to set up a link from a handset unit to a base unit. To aid data recovery, both frame structures contain a synchronization channel comprised of a 24-bit pattern referred to as a channel marker and a one-zero preamble pattern. The channel marker is referenced as a first signal if originated from a base unit, or as a second signal if originated from a handset unit. The identification of each may be different. The channel marker sent by the base unit to the handset unit may be the inverse of the channel marker sent by the handset to the base and, therefore, unless the detection and/or synchronization hardware is flexible with regard to the handling of these channel markers, it would be unlikely that a handset unit would link up with another handset unit unless the necessary code and/or hardware reconfiguration of one handset to act as a base unit was included.

Figure 7:
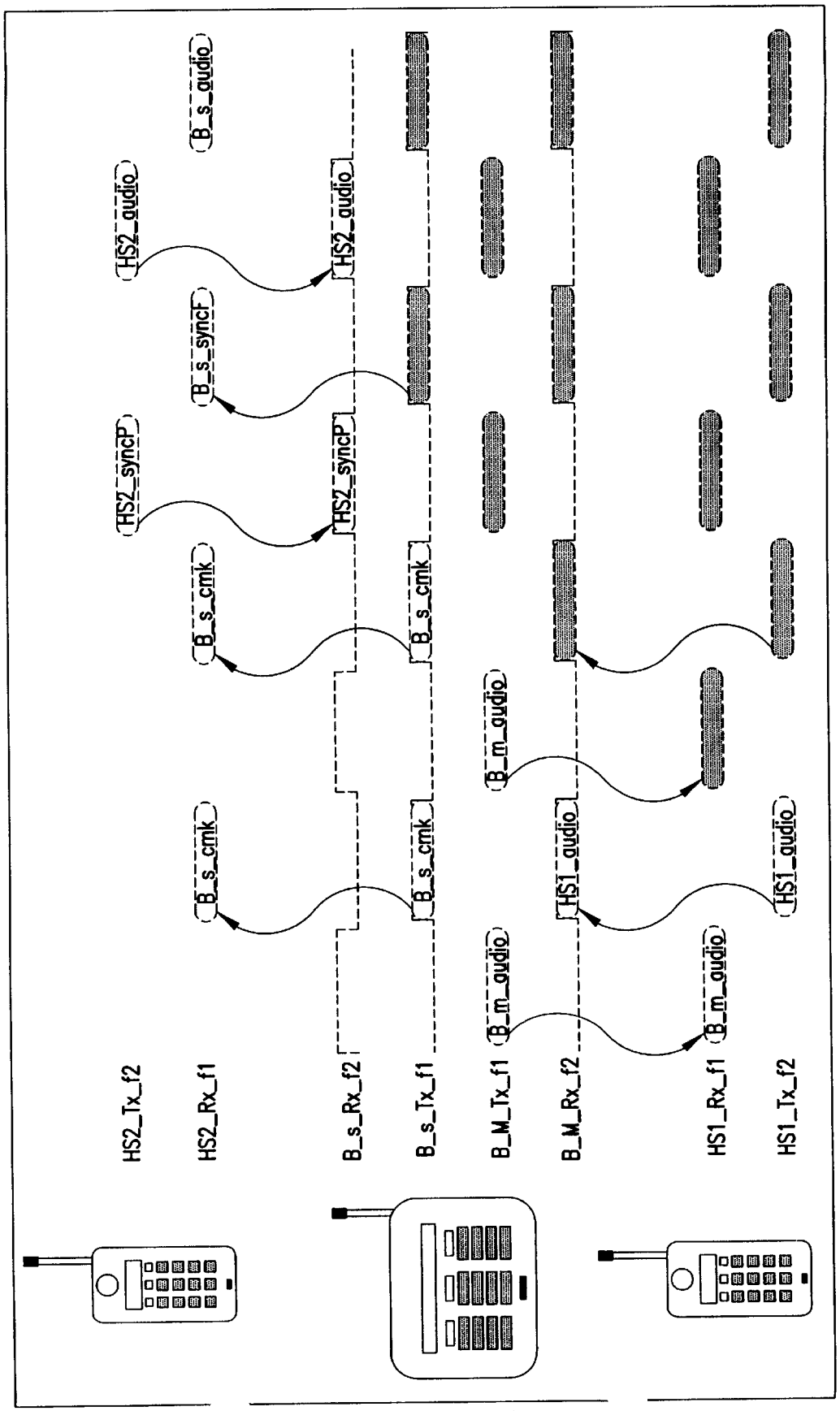
FIG. 7 schematically illustrates an embodiment of the frame structure of the communication system of the present invention.

Once a handset unit detects a channel marker pattern, it obtains frame synchronization from the channel marker pattern and then examines the message in the signaling channel to ascertain if a call is to be received. If a call is received, the handset unit responds with a certain command frame in conjunction with an appropriate response in the signaling channel. FIG. 7 illustrates the frame structure of the transmission and reception of signals between the two handset units and the base unit.

In sum the architectural embodiments, in effect, serve to set the frequenzy of the transmitted signal at a select frequency at a select shift from the received signal but, nonetheless, within the limits of the desired frequency range for the device. Although transmissions and receptions occur in a FDD manner in the embodiment, transmissions and receptions may occur simultaneously because of the TDD operation. This is so because the frequency duplexed communications over separate channels are also time duplexed on each of the separate channels. This enables simultaneous communication between two handset units and a single base.

As those skilled in the art will readily appreciate, the FDD/TDD dual channel system and method described herein provide significant improvements and advantages over the prior technology. Those skilled in the art will readily recognize the numerous variations and substitutions that may be made in the system and method and their use and configuration to achieve substantially the same results as achieved by the embodiment and, in particular, the preferred embodiments expressly described herein. Each of those variations and substitutions, as well as all other applications, of the system and method are intended to be included in the invention. The foregoing detailed description is, thus, to be clearly understood as being given by way of illustration and example only. The spirit and scope of the present invention is limited solely by the claims.

What is claimed is:

1. An FDD/TDD circuit arrangement in a radio-frequency communication unit, comprising:
   a TDD controller, wherein the TDD controller comprises a master TDD burst mode controller; and a slave TDD burst mode controller coupled to the master controller;
   a duplex antenna arrangement for receiving radio signals of a first frequency and transmitting radio signals of a second frequency;
   an oscillator for providing a reference frequency;
   first synthesizer coupled to the oscillator;
   a mixer circuit coupled to the antenna arrangement and to the first synthesizer;

a demodulator circuit coupled to the mixer and to the TDD controller; and a second synthesizer coupled to the TDD controller, antenna, and oscillator for providing a transmit signal.

2. An FDD/TDD circuit arrangement in a radio-frequency communication unit, comprising;

a TDD controller;

a duplex antenna arrangement for receiving radio signals of a first frequency and transmitting radio signals of a second frequency;

an oscillator for providing a reference frequency;

a first synthesizer coupled to the oscillator;

a mixer circuit coupled to the antenna arrangement and to the first synthesizer;

a demodulator circuit coupled to the mixer and to the TDD controller; and a second synthesizer coupled to the TDD controller, antenna, and oscillator for providing a transmit signal; and a first amplifier coupled to the antenna arrangement, the first amplifier powered only upon receiving radio signals.

3. The circuit arrangement of claim 2, further comprising a second amplifier coupled the antenna arrangement, the second amplifier powered only when transmitting radio signals.

4. An FDD/TDD circuit arrangement in a radio-frequency communication unit, comprising;

a TDD controller;

a duplex antenna arrangement for receiving radio signals of a first frequency and transmitting radio signals of a second frequency, wherein the first frequency is within a range of approximately 902 to 904 MHz and the second frequency is within a range of approximately 925.5 to 927.5 MHz, an oscillator for providing a reference frequency;

a first synthesizer coupled to the oscillator;

a mixer circuit coupled to the antenna arrangement and to the first synthesizer;

a demodulator circuit coupled to the mixer and to the TDD controller; and a second synthesizer coupled to the TDD controller, antenna, and oscillator for providing a transmit signal.

5. An FDD/TDD circuit arrangement in a radio-frequency communication unit, comprising;

a TDD controller;

a duplex antenna arrangement for receiving radio signals of a first frequency and transmitting radio signals of a second frequency, wherein the first frequency is separated from the second frequency by approximately 23.5 MHz, a first oscillator for providing a reference frequency;

a first synthesizer coupled to the oscillator;

a mixer circuit coupled to the antenna arrangement and to the first synthesizer;

a demodulator circuit coupled to the mixer and to the TDD controller; and a second synthesizer coupled to the TDD controller, antenna, and oscillator for providing a transmit signal.

6. A telecommunications system, comprising:

a first portable unit arranged to transmit radio signals of a first frequency and receive radio signals of a second frequency;

a second portable unit arranged to transmit radio signals of the first frequency and receive radio signals of the second frequency, the first and second portable units adapted to communicate simultaneously with a base unit;

the base unit including:

a TDD controller;

a duplex antenna arrangement for receiving radio signals of a first frequency and transmitting radio signals of a second frequency;

an oscillator for providing a reference frequency;

a first synthesizer coupled to the oscillator;

a mixer circuit coupled to the antenna arrangement and to the first synthesizer;

a demodulator circuit coupled to the mixer and to the TDD controller; and a second synthesizer coupled to the TDD controller, antenna, and oscillator for providing a transmit signal.

7. A telecommunications system, comprising:

a first portable unit arranged to transmit radio signals of a first frequency and receive radio signals of a second frequency;

a second portable unit arranged to transmit radio signals of a first frequency and receive radio signals of a second frequency;

a base unit including:

a TDD controller, wherein the TDD controller comprises a master TDD burst mode controller; and a slave TDD burst mode controller coupled to the master controller;

a duplex antenna arrangement for receiving radio signals of a first frequency and transmitting radio signals of a second frequency;

a first oscillator for providing a reference frequency;

a first synthesizer coupled to the oscillator;

a mixer circuit coupled to the antenna arrangement and to the first synthesizer;

a demodulator circuit coupled to the mixer and to the TDD controller; and a second synthesizer coupled to the TDD controller, antenna, and oscillator for providing a transmit signal.

8. A telecommunications system, comprising;

a first portable unit arranged to transmit radio signals of a first frequency and receive radio signals of a second frequency;

a second portable unit arranged to transmit radio signals of a first frequency and receive radio signals of a second frequency;

a base unit including;

a TDD controller;

a duplex antenna arrangement for receiving radio signals of a first frequency and transmitting radio signals of a second frequency;

an oscillator for providing a reference frequency;

a first synthesizer coupled to the oscillator;

a mixer circuit coupled to the antenna arrangement and to the first synthesizer;

a demodulator circuit coupled to the mixer and to the TDD controller;

a second synthesizer coupled to the TDD controller, antenna, and oscillator for providing a transmit signal; and a first amplifier coupled to the antenna arrangement, the first amplifier powered only upon receiving radio signals.

9. The circuit arrangement of claim 8, further comprising a second amplifier coupled the antenna arrangement, the second amplifier powered only when transmitting radio signals.

10. A telecommunications system, comprising;
- a first portable unit arranged to transmit radio signals of a first frequency and receive radio signals of a second frequency;
- a second portable unit arranged to transmit radio signals of a first frequency and receive radio signals of a second frequency;
- a base unit including;
- a TDD controller;
- a duplex antenna arrangement for receiving radio signals of a first frequency and transmitting radio signals of a second frequency, wherein the first frequency is within a range of approximately 902 to 904 MHz and the second frequency is within a range of approximately 925.5 to 927.5 MHz;
- an oscillator for providing a reference frequency;
- a first synthesizer coupled to the oscillator;
- a mixer circuit coupled to the antenna arrangement and to the first synthesizer;
- a demodulator circuit coupled to the mixer and to the TDD controller; and
- a second synthesizer coupled to the TDD controller, antenna, and oscillator for providing a transmit signal.

11. A telecommunications system, comprising;
- a first portable unit arranged to transmit radio signals of a first frequency and receive radio signals of a second frequency;
- a second portable unit arranged to transmit radio signals of a first frequency and receive radio signals of a second frequency;
- a base unit including;
- a TDD controller;
- a duplex antenna arrangement for receiving radio signals of a first frequency and transmitting radio signals of a second frequency, wherein the first frequency is separated from the second frequency by approximately 23.5 MHz;
- an oscillator for providing a reference frequency;
- a first synthesizer coupled to the oscillator;
- a mixer circuit coupled to the antenna arrangement and to the first synthesizer;
- a demodulator circuit coupled to the mixer and to the TDD controller; and
- a second synthesizer coupled to the TDD controller, antenna, and oscillator for providing a transmit signal.

* * * * *

UNITED STATES PATENT AND TRADEMARK OFFICE
CERTIFICATE OF CORRECTION

PATENT NO. : 6,134,227
DATED : October 17, 2000
INVENTOR(S) : Magana

Page 1 of 1

It is certified that error appears in the above-identified patent and that said Letters Patent is hereby corrected as shown below:

Column 2,
Line 47, "Frequencies" should read -- frequencies --.

Column 5,
Line 34, "A" should read -- a --.

Column 7,
Line 39, "mariner" should read -- manner --.

Column 8,
Line 15, "save" should read -- have --.

Column 9,
Line 21, "buttered" should read -- buffered --.

Column 10,
Line 29, "frequenzy" should read -- frequency --.

Column 11,
Line 26, after the word "coupled" please insert the word -- to --.

Column 13,
Line 2, after the word "coupled" please insert the word -- to --.

Signed and Sealed this

Twenty-sixth Day of February, 2002

Attest:

*Attesting Officer*

JAMES E. ROGAN
*Director of the United States Patent and Trademark Office*